(No Model.)

H. W. LIBBEY.
ELECTRIC BATTERY.

No. 504,130. Patented Aug. 29, 1893.

Witnesses.
Winifred L. Kerwin.
Edward E. Brown.

Inventor.
Hosea W. Libbey
by Edwin Plavets
attorney.

UNITED STATES PATENT OFFICE.

HOSEA W. LIBBEY, OF BOSTON, MASSACHUSETTS.

ELECTRIC BATTERY.

SPECIFICATION forming part of Letters Patent No. 504,130, dated August 29, 1893.

Application filed September 15, 1892. Serial No. 445,976. (No model.)

*To all whom it may concern:*

Be it known that I, HOSEA W. LIBBEY, a citizen of the United States, residing at Boston, in the county of Suffolk and State of Massachusetts, have invented certain new and useful Improvements in Electric Batteries, of which the following, taken in connection with the accompanying drawings, is a specification.

My invention relates to certain improvements in electric batteries whereby very great electric energy may be produced by uniting a series of cells.

The invention consists of a cell formed of positive and negative elements preferably of disk form and separated by a ring of insulating material and inclosed at each end by an insulating disk, the space between the two elements being filled with a suitable absorbent material, and the whole held together by a pipe or tube passing through the center, a tank being supported above the absorbent material to supply same with the required exciting fluid as hereinafter fully described and pointed out in the claims.

Figure 1:
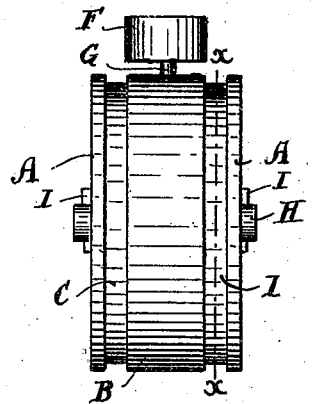
Figure 3:
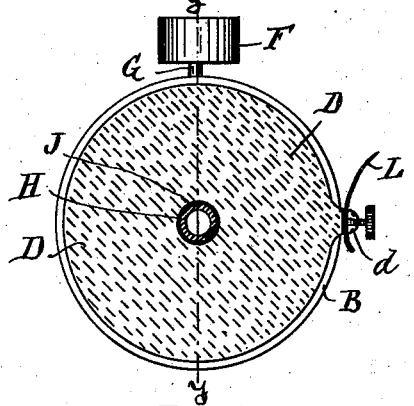
Figure 2:
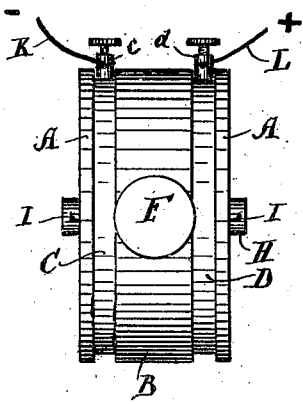
Figure 4:
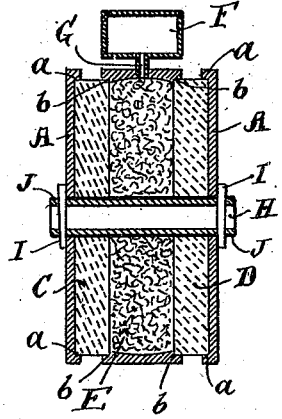
Figure 5:
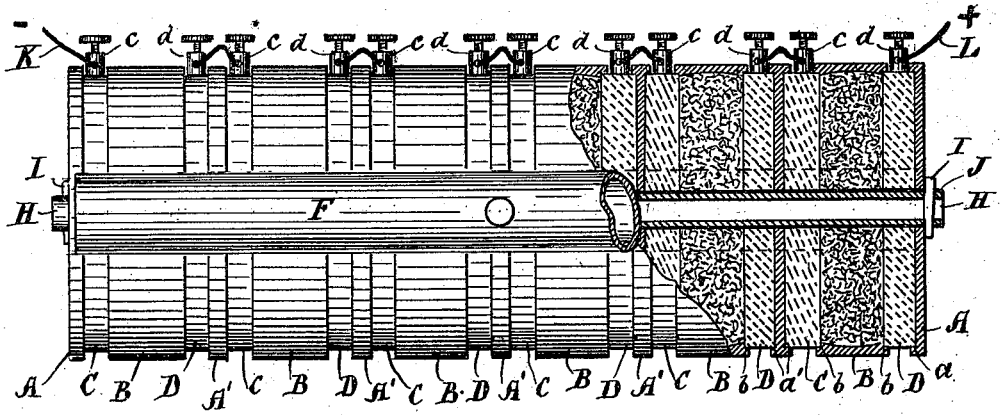

Referring to the accompanying drawings: Figure 1— represents a single cell embodying my invention. Fig. 2— is a plan or top view of same. Fig. 3— is a vertical section taken on line $x, x,$ of Fig. 1. Fig. 4— is a vertical section taken on line $y, y,$ of Fig. 3. Fig. 5— is a plan or top view and partial section of a battery consisting of a series of cells.

A, A, represent disks of any suitable insulating material, preferably porcelain.

B, is a ring of insulating material also preferably of porcelain.

C, is a disk or plate of zinc or other suitable material, and D, is a disk or plate of copper or other suitable material.

E, represents an absorbent material such as sponge.

F, is a tank for holding the exciting fluid (such as diluted sulphuric acid) and G, is a pipe for conducting said fluid to the absorbent material E.

H, is a pipe upon which the disks A, C, D, are mounted and are held together by keys I, or other suitable device. The pipe H, is preferably of metal covered with rubber or some suitable insulating material J (see Fig. 3).

The outer disks A, are formed with a rim or lip $a$, to embrace the outer edges of the disks C, D, and the ring B is formed with shoulders $b$, so that a suitable compartment is formed between the disks C, D, to contain the absorbent material E, and the inner surface of said ring is formed rounding, recessed or dish shaped, so that should the absorbent material E, be unable to hold all the fluid supplied it will be retained in said recess ready to be again taken up by the absorbent material.

To each of the disks C, D, is secured a binding post $c, d,$ for attachment to the wires K, L.

By reason of the exciting fluid being held by the absorbent material, said material is kept in the required moist condition (after it has been saturated) by the fluid that escapes from the tank, the pipe between the tank and the absorbent material being of such size as to supply the said fluid drop by drop. It will be seen that by this construction the results are about the same as that obtained by a simple voltaic cell with the advantage that there is not any fluid that can be spilled or shaken up so as to interfere with the action of the same, and with a further advantage that the fluid is so supplied to the absorbent material so as to compensate for any loss. In Fig. 5 I have shown a series of said cells connected to form a battery, all of said cells being mounted upon a single tube, the construction being the same as that before described with reference to a single cell excepting that the positive and negative elements of the adjacent cells are separated by disks A', having rims or lips $a'$, on each side to hold said disks. The power of a battery thus constructed is only limited by the number of cells employed, and as they are in such compact form they will occupy but a small space so that very powerful batteries may be produced to supply the required electric energy for driving street cars, electric lights and all places where a strong electric current is required. Should the surfaces of the disks become corroded so as to diminish the power of the cell or battery they can be readily separated so as to be cleansed by removing one of the keys I, or other fastening.

Although I prefer to have the positive and negative elements of disk form it is obvious that they may be of any other desired form such as square or hexagon.

What I claim is—

1. In an electric battery a cell consisting of two outer disks or plates of insulating material, a central ring of insulating material, two disks or plates forming the positive and negative elements, an absorbent material between said disks or plates, and means for supplying exciting fluid to said absorbent material as set forth.

2. In an electric battery a cell consisting of two outer disks or plates of insulating material, a central ring of insulating material, two disks or plates forming the positive and negative elements and held between said disks and ring, an absorbent material between said positive and negative elements, all the parts being mounted and held upon a tube and a tank arranged at the top and connected to the space containing the absorbent material for supplying the same with fluid as set forth.

3. In a battery the combination of positive and negative elements of disk form held between a central ring and disks of insulating material, an absorbent between said elements for holding the exciting fluid, all of which are mounted and held upon a central tube insulated therefrom, and means for supplying said absorbent material with fresh exciting fluid when required as set forth.

In testimony whereof I have signed my name to this specification, in the presence of two subscribing witnesses, on this 29th day of August, A. D. 1892.

HOSEA W. LIBBEY.

Witnesses:
CHAS. STEERE,
EDWIN PLANTA.